(12) United States Patent
Rihani (10) Patent No.: US 12,235,834 B2
(45) Date of Patent: Feb. 25, 2025

(54) SMART SELECTION OF DATA FIELDS DURING DATA ANALYSIS

(71) Applicant: SAP SE, Walldorf (DE)

(72) Inventor: Lamine Rihani, Sartrouville (FR)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/347,734

(22) Filed: Jul. 6, 2023

(65) Prior Publication Data

US 2025/0013632 A1 Jan. 9, 2025

(51) Int. Cl.
*G06F 16/24* (2019.01)
*G06F 16/242* (2019.01)
*G06F 16/2458* (2019.01)
*G06F 16/28* (2019.01)

(52) U.S. Cl.
CPC ...... *G06F 16/2423* (2019.01); *G06F 16/2474* (2019.01); *G06F 16/283* (2019.01)

(58) Field of Classification Search
CPC . G06F 16/2423; G06F 16/2474; G06F 16/283
See application file for complete search history.

(56) References Cited

U.S. PATENT DOCUMENTS

| | | | | |
|---|---|---|---|---|
| 2018/0218051 | A1* | 8/2018 | Berger | G06F 16/951 |
| 2020/0319857 | A1* | 10/2020 | Lonial | G06F 3/0482 |
| 2023/0013949 | A1* | 1/2023 | Vijayaraghavan | G06Q 20/407 |

* cited by examiner

*Primary Examiner* — Apu M Mofiz
*Assistant Examiner* — Cindy Nguyen
(74) *Attorney, Agent, or Firm* — Fish & Richardson P.C.

(57) ABSTRACT

The present disclosure relates to computer-implemented methods, software, and systems for generating intelligent data reports based on insight into key aspects of the data to provide reports that include identified trends. A first selection for a first data field from a list of data fields exposed for report generation is received. Predictive logic is executed to identify trends in data from a data source associated with i) a first dimension of the data corresponding to the selected first data field and ii) at least one additional dimension corresponding to at least one additional data field. A second data field is identified as corresponding to a second dimension correlated with the first dimension to define trends in the data. A report generated based on data associated with the selected first and second data fields are presented at the interface.

20 Claims, 4 Drawing Sheets

SMART SELECTION OF DATA FIELDS DURING DATA ANALYSIS

TECHNICAL FIELD

The present disclosure relates to computer-implemented methods, software, and systems for data processing, query execution, and report generation.

BACKGROUND

Software complexity is increasing and causing changes to lifecycle management and maintenance of software applications, databases, and platform systems. In today's data-driven world, businesses are generating large volumes of data daily. Inefficient data analysis and reporting can be associated with inefficient utilization of resources and manpower. Challenges lie in analyzing and interpreting collected data to derive meaningful insights and make informed decisions.

SUMMARY

Implementations of the present disclosure are generally directed to a computer-implemented method for generating intelligent data reports based on selection of data of one or more data sources.

One example method may include operations such as: receiving, at an interface associated with an analytical tool, a first selection by a user of a first data field from a list of data fields exposed for report generation; in response to receiving the first selection, executing predictive logic to identify trends in data from a data source associated with i) a first dimension of the data corresponding to the selected first data field and ii) at least one additional dimension corresponding to at least one additional data field; identifying a second data field from the at least one additional data field from the data fields for report generation, wherein the second data field corresponds to a second dimension correlated with the first dimension to define trends in one or more measurements from the data from the data source; and in response to identifying the second data field, presenting, at the interface associated with the analytical tool, i) a selection of the first and the second data fields from the list of data fields and ii) a first report generated based on data associated with the selected first and second data fields.

Particular embodiments of the subject matter described in this specification can be implemented to realize one or more of the following advantages. First, based on the implementations of the present disclosure, a selector component (smart selector for data fields to be included in a report) can support an efficient and data-driven way to select the most relevant data fields when selecting data for generating a report. By leveraging predictive analytics and machine learning algorithms, the selector component can quickly and accurately identify the most important data fields for a particular analysis or report based on an initially selected data field or while guiding a user to generate a report in a continuous interaction of data selection that includes user selected and selector provided data fields in an iterative manner. Based on the implementations of the present disclosure, users can significantly reduce the required time and effort to identify data to generate meaningful results compared to a standard approach of sifting through a vast amount of data to identify data trends. The selector can provide suggestions for data fields to be added for a report in real-time and based on evaluation of real-time data (e.g., real-time stored data used for generating the reports and/or real-time data for stored reports that are currently generated).

By automating the data field selection process, the selector component can optimize the performance of the computing device where a report is initiated and generated as well as free valuable resources to execute further tasks for the user. By leveraging predictive analytics and machine learning algorithms, more accurate data field selection can be achieved that can support process performances related to the report data. The selector component can include predictive logic that can be customized to the specific needs of a user and rely on a customized rule set for determining how to identify data fields that match user criteria, such as criteria related to types of data to be selected, tailored suggestions based on the user role, or organization and presentation of data in the report (e.g., different report types may be available), among other example criterion.

Based on the implementations of the present disclosure, the report generation can be executed in a faster, more efficient manner that produces accurate results by promoting a user-friendly selection of data fields based on insight gained from the data available for report generation and historical data for reports generated by other users.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors and a computer-readable storage medium coupled to the one or more processors, having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description, drawings, and the claims.

DETAILED DESCRIPTION

The present disclosure describes various tools and techniques for generating intelligent data reports based on insight into key aspects of the data to provide reports that include identified trends.

One key challenge in data analysis and report generation is how to determine and select the right data fields from a data model for a data set to provide meaningful results. In some cases, without prior knowledge of correlation between the data fields, a report generation task can be cumbersome and may require multiple trials until the fields that are selected for the report can yield a report that shows a trend or pattern in the data. In today's data driven world, the vast amount of accumulated data makes it difficult to choose the right data (and the most relevant data) quickly to generate a report in an efficient and accurate way to provide meaningful results for different use cases. For example, if a database stores data for sales of various products at various locations that are associated with various providers, generating a report that includes relevant trends in the sales associated with a particular product can be difficult. Such a report can be associated with multiple possible selections of combinations of fields (e.g., combining one product with a particular location and various providers, combining all products with a particular location and presenting information for sales revenue, etc.) before a meaningful report (i.e., a report that includes a trend or pattern in the association between data fields) is generated. For example, a meaningful report can be a report that shows a particular trend in the months with the highest sales in a particular geographical location.

In some cases, when a data set is associated with multiple data fields (e.g., attributes), generation of a report by a user based on a selection of a set of the data fields can be associated with manual and time-consuming processes of sifting through the data to select those data fields related to a particular report or analysis goal (e.g., trends in sales of apple juice) that can result in an output showing trends in the data set. A user may struggle to determine which data fields are the most relevant and important for a particular analysis or report. Furthermore, the selection of data fields can also be a complex task, as users need to consider a range of factors such as the data type, role, and relevance of each data field. This can be particularly challenging when dealing with a large pool of potential data fields, leading to suboptimal analysis and reporting. Without an effective tool for data field selection, generation of reports that support an organization's performance may be associated with high costs as well as poor user experience for those working on the report generation. For example, users, and the stakeholders who can benefit from the data analysis, may experience significant delays in the data analysis result generation and the reporting process in general. This can result in missed business opportunities, incorrect decisions, and a lack of visibility into key data metrics that can be associated with the business performance.

In accordance with the present implementation, a smart selector is proposed that leverages predictive analytics and machine learning algorithms to provide an insightful and more efficient way to select data fields for analysis and reporting. In some instances, when a user selects a data field for generating a report, the smart selector can intuitively propose other data fields related to the selected data field that may result in a data report that includes trends identified in the data set for the first selected data field. Further, the inclusion of further data fields can be based on an analysis of historically requested reports that include the user-selected data field to infer at least one other field that is used for generating a report based on a data field inclusion criterion. In some cases, a combination of (1) knowledge about correlation between fields and (2) knowledge about any prior usages of fields to generate past reports can be used to determine a proposed new data field to be included for a newly generated report based on an initial selection of a data field (or multiple selected initial data fields).

For example, the smart selector can be implemented as part of an analytical tool (e.g., a cloud analytical tool or an on-premises tool) that is used for analyzing data such as sales data of a company. A user, such as a sales manager, or other user roles defined in the analytical tool such as a planner, operations specialist, for example, can be provided with an interface to select and filter data to generate a report. For example, the sales manager may want to create a report to see how the sales quantities for different products vary by region and by salesperson or sales representative. For example, the sales manager can use data from data source(s) that are accessible to the user and to the analytical tool. In that example, the user can start creating the report by selecting data fields presented for selection at the user interface. For example, a sales quantity measure or a particular product (e.g., sport shoes) can be selected to initiate the report generation. A smart selector component can obtain the selected data field and use machine-learning algorithms to analyze historical data trends to identify the most relevant dimensions associated with the initially selected data field. For example, if a salesperson has selected "Sales Quantity" as a dimension of type measure to focus on analyzing sales volumes, the smart selector can use predictive logic to analyze available historical data trends in the data that is available for the user and for the report generation to identify one or more other data fields (corresponding to dimensions in the data) that can be relevant for a report that includes "Sales Quantity." The analysis of historical data trends can be performed by recognizing correlations between data fields associated with the data, and/or analyzing available reports generated based on the same data that also includes the selected data field (i.e., "Sales Quantity"). The selector can suggest using, or can actively and automatically select, further data fields such as data field "Product" and/or "Sales Region" as fields associated with data values that are correlated with the data for the "Sale Quantity."

For example, the selector can analyze the correlation between the sales quantity and other dimensions associated with the data, and can then provide as suggested those data fields that correspond to dimensions that are highly correlated. For example, the data for the sales quantities can be highly correlated with the type of products, with the locations where the sales are executed, with a particular time period (e.g., months, years, seasons, etc.), or with the salesperson who is associated with the sales execution, among other example data fields that can be associated with the sales execution.

In some instances, the data associated with sales quantities can be associated with data trends when considered with data for the salesperson. For example, a particular salesperson can sell extremely high quantities compared to others, and thus the distribution of the sales and the performance of the salespeople may not be balanced. Other example relations between data of different data fields (and respective dimensions) can also be identified. For example, sales quantities can exhibit surprisingly low values for a particular product (e.g., alcohol) or geographical region, at a particular time. In that example, such trends may be evaluated and interpreted by a sales manager to make further business decisions for supply and demand of alcohol in those areas during such time periods. Thus, a smart selector can propose the selection of data fields such as "Alcohol", "Location X", and "Month" in addition to the "Sales Quantity" field. In contrast, if the report generation is not supported by a smart selector to identify such trends and to propose such selection, a sales manager who needs to identify such a trend may be required to generate multiple reports and review data associated with various products and locations, and browse through different time dimensions to identify a specific trend in the sales of alcohol.

In some instances, the selector can automatically select one of the fields "Product" and "Sales Region," or both together, and can generate a report based on the selection. Further, the user interface may allow for further interaction with the data fields to filter the report even further. For example, the sales manager may select the "Electronics" product category and/or the "West" sales region to request a report to see how sales of electronics products vary in the western region. Alternatively, the sales manager may select a specific salesperson within the "Salesperson" dimension to see how their sales performance compares to others in the same region or product category. The selection of the "Salesperson" dimension and the specific salesperson may be a user-defined selection once the selector has provided suggestions for further data fields to be included in the report. In this way, the sales manager can iteratively navigate the definition of fields to be included in a report based on consecutive selections by the user and the selector. During the selection process, either done by the user or the selector, a report can be visualized.

In accordance with implementations of the present disclosure, the selector can perform the selection of data fields by relying on predictive analytics capabilities, which can support the sales manager (or other example users) in quickly identifying the most relevant dimensions for analysis of data related to "Sales Quantity". The data fields suggested by the selector can be associated with specific values in the dimensions corresponding to the data fields that can further support the generation of a report focused on the analysis of data related to sales quantities (as indicated with the initial user selection). The suggestion of further data fields that can be used to generate reports which include trends in data can support accurate and fast report generation that supports informed decision-making processes.

In some instances, the smart selector can rely on understanding of correlation between data fields of a data set to propose a data field(s) to be included, in addition to generating a data report when one or more data fields have already been initially selected. In other instances, the smart select can rely on analysis of historical data to identify the most relevant data fields that can be included. For example, during a data selection process to build a report, a user may be provided with real-time insights into the most relevant fields for generating the report based on an initially selected one or more data fields. The real-time insight can be based on a predictive analysis performed over data for a plurality of data fields (e.g., analysis of relationship between data fields such as product type, country, time, distributor, or else). If reports are generated based on insight into correlation between data fields, the reports' generation can be performed faster and with fewer interactions to provide results that can support informed decisions and ultimately lead to better outcomes. This can in turn improve the performance of the processes and the entities associated with the data used for the predictive analysis and report generation.

In some instances, reports can be generated based on data from one or more data sources and according to a predefined set of data manipulation operations. In some instances, a data source may support different data manipulation operations natively. The execution of the data manipulation operations that are not natively supported by a data source can be performed based on an extraction of data from the data source according to a defined query execution plan that supports the subsequent execution of the data manipulation operation outside of the data source technology stack. In some instances, extracted data from data sources can undergo further data manipulations such as aggregation based on data extraction, transformation, and loading techniques.

Figure 1:
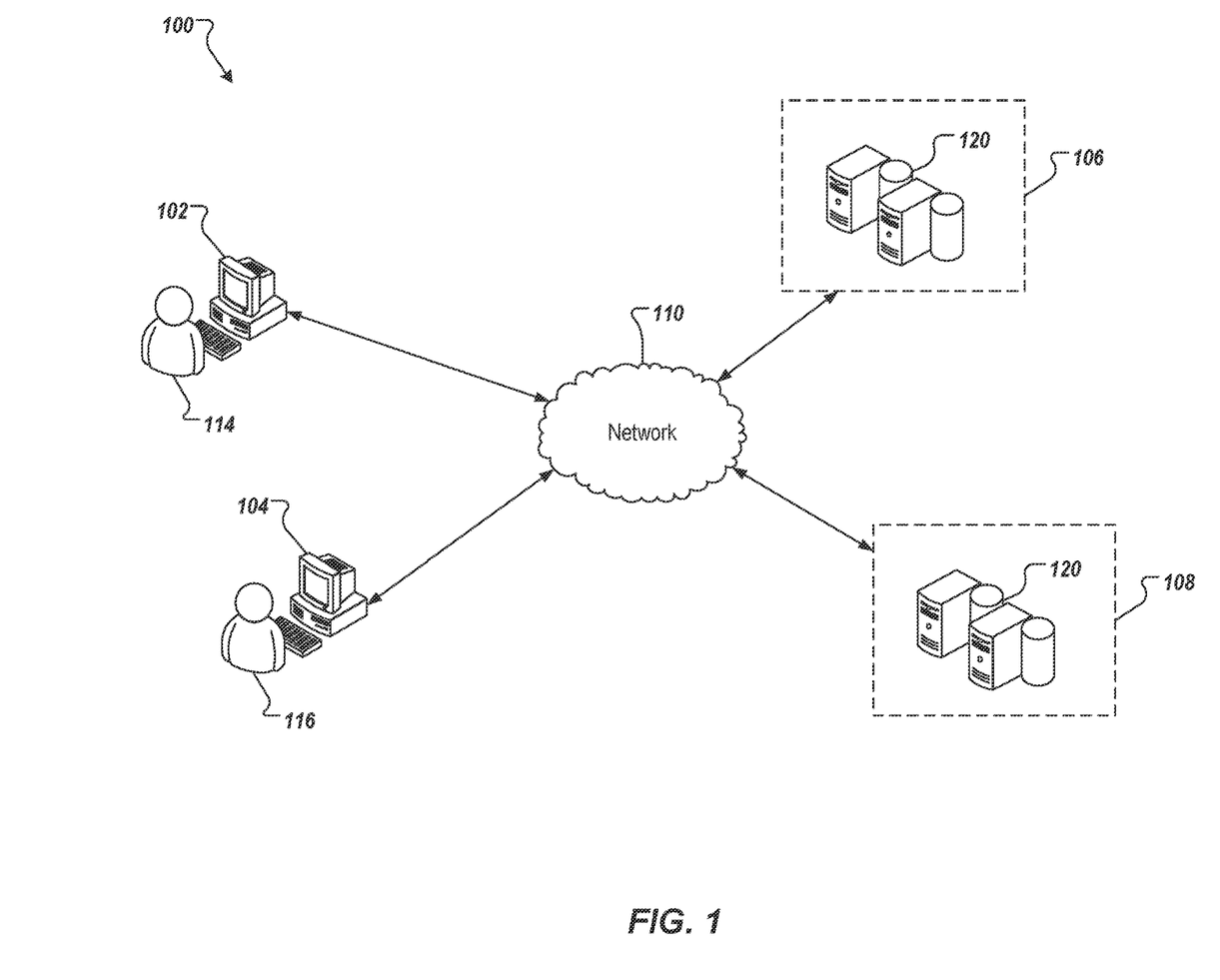
FIG. 1 is a block diagram depicting an example computer-implemented system that can execute implementations of the present disclosure in accordance with implementations of the present disclosure.

FIG. 1 is a block diagram depicting an example computer-implemented system 100 that can execute implementations of the present disclosure in accordance with implementations of the present disclosure. In the depicted example, the example system 100 includes a client device 102, a client device 104, a network 110, a computing environment 106, and a computing environment 108. The computing environment(s) 106 and/or 108 can be cloud computing environments that can include one or more server devices and databases (for example, processors, memory). In the depicted example, a user 114 interacts with the client device 102, and a user 116 interacts with the client device 104.

In some examples, the client device 102 and/or the client device 104 can communicate with the environment 106 and/or environment 108 over the network 110. The client device 102 can include any appropriate type of computing device, for example, a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 110 can include a large computer network, such as a local area network (LAN), a wide area network (WAN), the Internet, a cellular network, a telephone network (for example, PSTN), or an appropriate combination thereof connecting any number of communication devices, mobile computing devices, fixed computing devices and server systems.

In some implementations, the environment 106 (and/or the environment 108) can include at least one server and at least one data store 120. In the example of FIG. 1, the environment 106 is intended to represent various forms of servers including, but not limited to, a web server, an application server, a proxy server, a network server, and/or a server pool. In general, server systems accept requests for application services and provide such services to any number of client devices (for example, the client device 102 over the network 110).

In accordance with implementations of the present disclosure, and as noted above, the environments 106 and/or the environment 108 can host applications and databases running on the host infrastructure. In some instances, the environment 106 can include multiple cluster nodes that can represent physical or virtual machines that can represent web node clusters. A hosted application and/or service can run on virtual machines (VMs) hosted on cloud infrastructure.

In some instances, the environment 106 and/or the environment 108 can provide infrastructure for hosting an analytical tool in accordance with the present disclosure.

Figure 2:
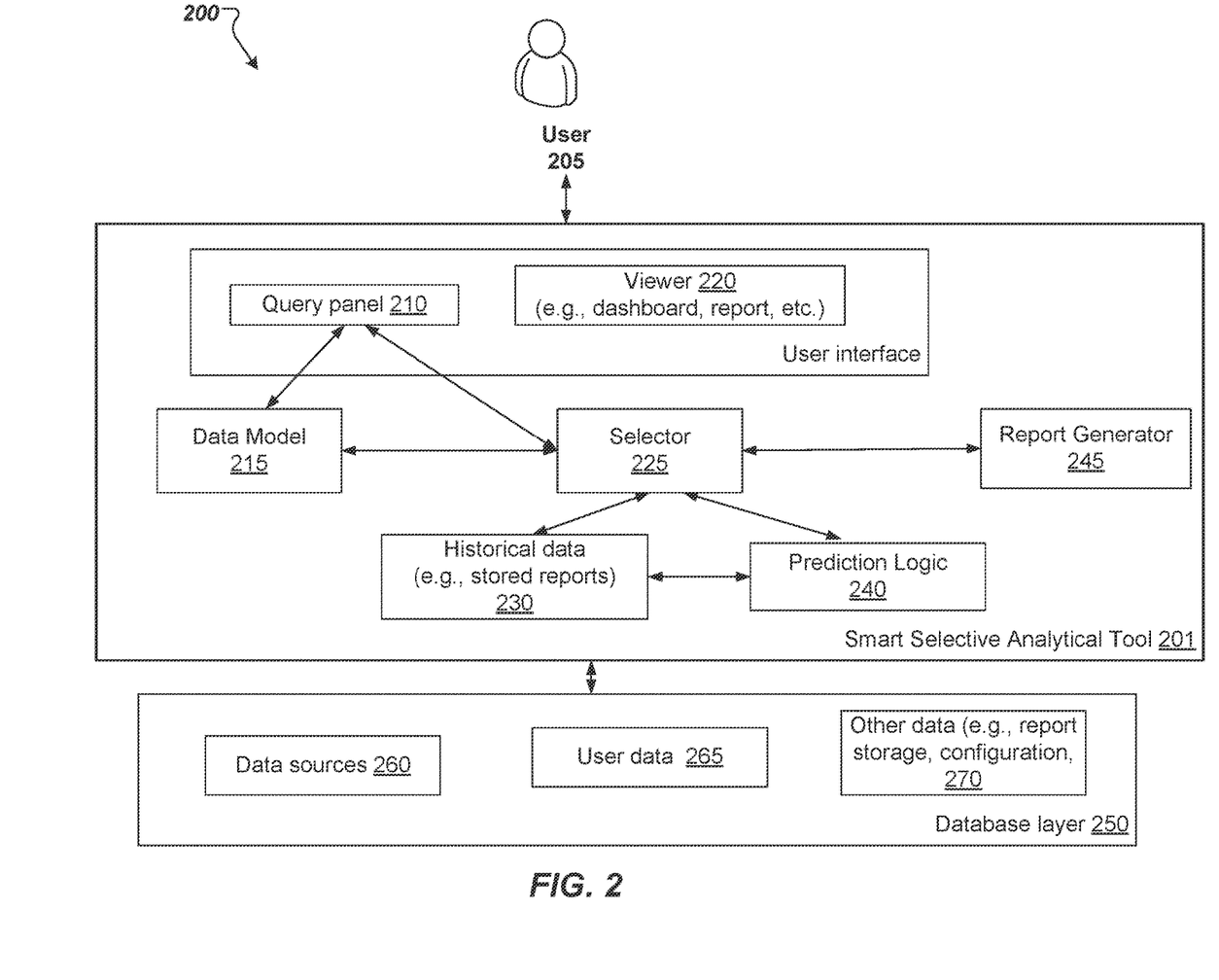
FIG. 2 is a block diagram of an example computing environment including a smart selective analytical tool to support report generation in accordance with implementations of the present disclosure.

In some instances, the environments 106 or 108 can host a smart selective analytical tool (e.g., the Smart Selective Analytical tool 201 of FIG. 2) or a smart selector service (e.g., the Selector 225 of FIG. 2).

In some instances, at least one of the environments 106 or 108 can host a service component that employs predictive analytics and machine learning algorithms to facilitate efficient and insightful data field selection for analysis and reporting based on user-provided selection of at least one data field for the data analysis and report generation. In some instances, the service component can expose a user interface including a query panel to provide options for defining a report and a viewer panel to present the report as generated.

In some implementations, when a user selects a data field from a data set (e.g., the data field is mapped to a model entity of a data model defining the data set) through the query panel, the service component can analyze historical data trends using correlation analysis and pattern recognition to identify the most relevant data fields for the analysis or report.

FIG. 2 is a block diagram of an example computing environment 200 including a smart selective analytical tool 201 to support report generation in accordance with implementations of the present disclosure.

The smart selective analytical tool 201 can be an analytical service or application, running in a cloud computing environment or on-premises environment. The smart selective analytical tool 201 can communicate with one or more users to provide analytical services based on data provided from a database layer 250 or from an external data source that is communicatively coupled to the smart selective analytical tool 201. Further, the database layer 250 can include user data 265 that can be used for aggregating data for generated reports based on user roles and association with an account (e.g., when multiple accounts can be defined as authorized to use the smart selective analytical tool 201).

In some instances, the smart selective analytical tool 201 can be provided as part of a report builder solution, data explorer solution, planning and forecasting service, or a dashboard builder, among other example analytics software solutions that can incorporate the logic of a smart selector to improve the experience and efficiency during report generation.

In some instances, a user 205 can interact with a query panel 210 provided by a user interface associated with the smart selective analytical tool 201 to obtain user selections and/or other input for defining a query to generate a report that can be visualized at a viewer 220. In some instances, the query panel 210 can provide a list of data fields associated with a data source, such as a data source from data sources 260 of the database layer 250. The data fields from the list can correspond to dimensions identified in the data of the data source. In some instances, the data fields are defined based on a data model 215 associated with the data that is to be used for the report (e.g., data from the data sources 260 or other data set). In some instances, the data model 215 can be generated as a live data model where the smart selective analytical tool 201 is provided with information about the type of data and categories of the data in a data source that is to be used for a report. In some other instances, the data model 215 can be obtained, for example, as an imported data model for a data set that is provided to the smart selective analytical tool 201. In the case of a live data model, the analytical tool does not have access to the data and does not understand the volume of the data that may be associated with executing a query to generate a report. In the case of an offline data model, the analytical tool has access to the data and real-time data analysis can be performed, stored, reused, and updated to support the analytical services provided by the smart selective analytical tool.

In some instances, the query panel 210 can display the list of data fields in a hierarchical structure (e.g., a tree structure), where various dimensions are defined as parent nodes and other dimensions are defined as sub-nodes (or child nodes). For example, the dimension "Products" can be defined as a parent node, where the child nodes can correspond to various products that are identified in the data such as trousers, t-shirts, skirts, shoes, accessories, other product types. The dimensions can be of different types and can include categorical, transactional, and numerical data in the data set of the data source. For example, a data source can include data for executed sales in relation to various products, various locations, associated with various brands, retailers, or time periods, among other example categories of the data that can be stored at the data source. The data source can be used for generation of various data reports that can look into specifics of the data from different perspectives. For example, a report can be directed to sales revenue, to performance of a salesperson, to performance at a particular location (e.g., a town or a country), or to a particular product and a period of time of high/low demand, or other criteria or goal for the report generation.

When a user initiates a report generation and selects a data field, the query panel 210 can communicate with a selector 225. The selector 225 can be such as the smart selector previously discussed that can facilitate the report generation by identifying related data fields to already selected data field(s) to provide reports that include identified historical patterns. The selector 225 can obtain a selection as defined at the query panel 210 and can execute predictive logic 240 to determine correlations between data associated with the selected data field(s) and each or some of the other data fields associated with the data. In some instances, the prediction logic 240 can be executed as part of the selector 225 or as an externally implemented component. The prediction logic 240 can calculate correlation coefficients (e.g., Pearson coefficients) between different pairs (or other tuples) of data fields including the user selected data field to measure correlation strength and further use pattern recognition algorithms (e.g., k-nearest-neighbors (KNN) algorithm) to identify relevant data fields based on historical patterns that can be identified in historical data 230. The Selector 225 can provide users with real-time insights into the most important data fields, allowing them to select and organize those fields for analysis and reporting quickly and easily.

In some instances, the selector 225 and the predictive logic 240 can be customized to meet specific needs for supporting the data field selection during the process of defining a report. In some instances, customizations can be defined on a user level, user role level, or organizational level, among others, and can be stored as data 270 at the database layer 250. For example, based on identifying a role of the user 205, a suggestion for one data field over another data field can be made based on customized preferences or needs of the user, role, or entity. In some examples, two data fields can be related to an initially requested data field from the user, and based on the customizations, a selection of one field over the other can be made. In some more examples, the determination of which data field to be selected can be based on other criteria such as user scenario, account to which the user is associated, historical data, user input, or external application or system input, among other examples. In some instances, the predictive logic 240 can be customized and trained to learn specific patterns in data field selection for a particular user or an account associated with the user, thus to adapt the suggestions for further data fields based on patterns identified during past report generations. In some instances, the predictive logic 240 can include predictive analytics and machine learning techniques to train a model that based on an input of one or more data fields can output predicted additional data fields that could potentially be relevant for the report generation that is requested by the user 205. The model may be trained based on historical data 230 including stored past reports executed by used at the tool 201, or based on stored interaction data for users requesting reports at the tool 201.

In some instances, the selector 225 and the prediction logic 240, whether implemented separately or as a single component, can be deployed on-premises or in the cloud, and can be integrated with a variety of data sources, such as databases, data warehouses, and data lakes. The selector 225 can be integrated into various solution-providing features within an analytics or planning software.

In some instances, the selector 225 and the prediction logic 240 can support the identification of an additional data field from the data of the data source used for the report generation as requested by the user 205. The additional data field can be a dimension of a different type, including a generic dimension (e.g., product), a measure (e.g., sales revenue, sales quantity), or a time dimension (e.g., year, month, season, quarter, etc.). The prediction logic 240 (whether implemented separately or incorporated in the selector 225) can use machine learning algorithms to analyze historical data trends in the data and identify the most relevant data fields for analysis to generate the report.

In some instances, to determine the most relevant data field, the prediction logic 240 can use correlation analysis to identify how strongly each field is correlated to a data field selected by the user 205. In some instances, correlation can be measured using a Pearson correlation coefficient, which is calculated as the covariance between the two variables divided by the product of their standard deviations, as shown in formula (1) below:

$$r = cov(X, Y)/(std(X)*std(Y)) \quad (1)$$

where X and Y are the two variables being compared, cov(X, Y) is their covariance, and std(X) and std(Y) are their standard deviations.

In addition to correlation analysis, the prediction logic 240 can use pattern recognition to identify which data fields are most relevant for the data field selected by the user. This can involve analyzing historical data trends in historical data 230 to identify patterns that are specific to the selected data field (e.g., in 90% of the generated reports the sales quantities are observed in relation to regions) and then use those patterns to identify other data fields that are likely to be relevant (e.g., look whether there is a correlation between a particular region or set of regions are sales quantities). Pattern recognition can be implemented using a variety of machine learning algorithms, such as decision trees, neural networks, or support vector machines.

In some instances, a pattern recognition algorithm that can be employed by the prediction logic 240 component can be the KNN algorithm, which works by identifying the k data points in the training set (e.g., the historical data 230 or else) that are closest to the input data point, and then using the labels of those data points to make a prediction about the label of the input data point. Mathematically, the KNN algorithm can be expressed as follows in formula (2) below:

$$y = mode(\{y1, y2, \ldots, yn\}) \quad (2)$$

where y is the predicted label of the input data point, mode is the most common label among the k-nearest neighbors, and y1, y2, . . . yn are the labels of the k-nearest neighbors.

By combining correlation analysis and pattern recognition when performing the selection (smart selection) of additional data fields, accurate identification of the most relevant data fields for a given data analysis and report can be achieved. This can allow users to quickly and easily select the most prominent data fields to propose a report that includes identified data trends and specifics (correlations) identified in the data prior to the report generation.

Figure 3:
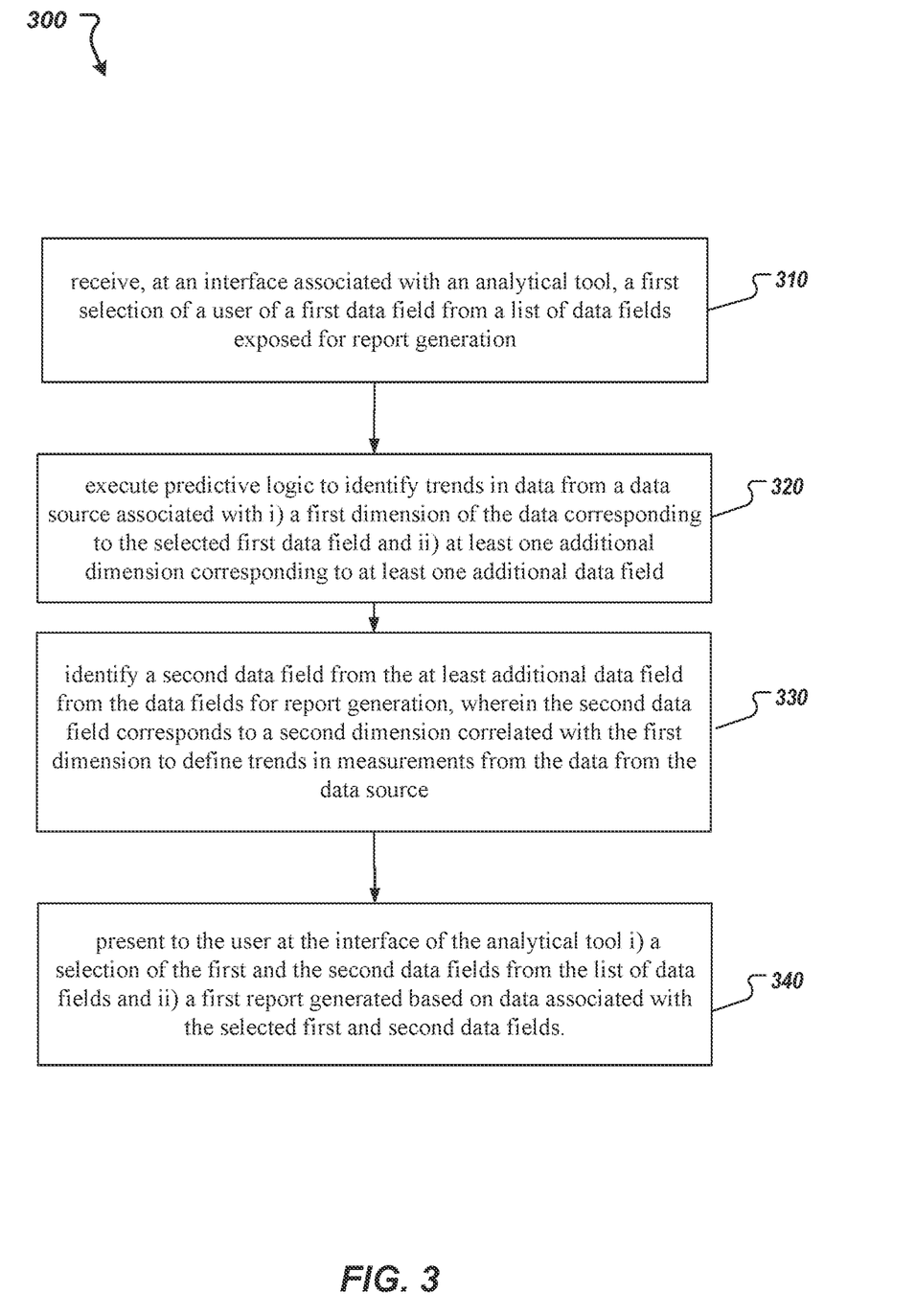
FIG. 3 is a flow diagram of a method for report generation based on smart selection of data fields for identifying trends in the data in accordance with implementations of the present disclosure.

For example, the selector 225 can be implemented to execute the process 300 of FIG. 3. The selector 225 can support data field selection that ensures that a planning and/or forecasting activity based on the report can be based on accurate and up-to-date data. Further, the smart selection of further data fields to rapidly generate reports based on identified insight for trends in the data can be used to automate the report generation process and reduce resource expenditures. The use of predictive analytics and machine learning algorithms can allow users to save time and effort in data field selection by performing the data field selection not solely based on user input but in a data-driven approach based on analysis of the data used for the report and/or historical data for past report generations.

In some instances, the selector 225 can obtain a suggestion for one or more additional data fields to be used for a report from the prediction logic 240. The selector 225 can provide the obtained one or more additional data fields together with a user-selected data field at the query panel 210 to a report generator 245 to generate a report and output the report result at the viewer 220. The report generator 245 can be used in the context of building reports or data exploration scenarios where the selector 225 can be used to generate one or multiple reports based on instructions from the user to support business decisions and/or to execute data exploration that can be used as input for further processes (e.g., further data collection or data acquisition, inclusion of more data sources for generating a report, etc.).

Once the report is generated, the query panel 210 can be updated to include the data fields used for the report and also to be open for further filtering of the data used for the report or modification of the query to adjust a used field or to focus on a particular narrower data field category (e.g., when data fields are defined in hierarchical manner, a user can select a particular sub-category such as "Shoes" from the data field "Product").

In some implementations, once a report is generated for a particular user request from user 205 and the selector 225 has facilitated the report generation by suggesting some of the data fields, the report can be stored, for example, at the database layer 250 and/or as part of the historical data 230 that can be further used to train the machine learning algorithms implemented at the predictive logic 240.

FIG. 3 is a flow diagram of a method 300 for report generation based on smart selection of data fields for identifying trends in the data in accordance with implementations of the present disclosure. In some instances, the method 300 can be executed at a computing environment such as the one provided by the example computing environment 200 of FIG. 2. The method for report generation can be executed at an analytical tool such as the smart selective analytical tool 201 of FIG. 2 and/or based on an analytical tool that incorporates smart selection logic as described throughout the present disclosure and for example implemented at selector 225 and prediction logic 240 of the tool 201 of FIG. 2.

At 310, a first user selection of a first data field from a list of data fields exposed for report generation is received. The selection is received at an interface associated with an analytical tool, for example, at a query panel 210 of FIG. 2. The query panel 210 can include a list of data fields that can be presented in a hierarchical manner to present different data objects representing categorical, transactional, or numerical data in the data that is to be used for the report generation. A data source can be defined as relevant for the report generation. A data model can be defined for the data in the data source. The data model can include model entities that can be provided as data fields at the user interface for selection and filtering of the data in the data source for generating a report.

In some instances, prior to the first user selection of the first data field, the user may request to connect to a data source. For example, a request for connection of the data source through the interface (e.g., graphical user interface) of the analytical tool can be received. In response to the request for the connection, the data source can be connected, and a data model associated with the data source can be used for generating a report. The model entities of the data model can be provided for user selection as data fields at the interface (e.g., as discussed in relation to FIG. 2).

At 320, in response to the first user selection, predictive logic to identify trends in data from the data source is executed. The predictive logic can be substantially similar to the discussed predictive analytics and machine learning algorithms that can be executed in relation to the selector 225 and the predictive logic 240 of FIG. 2. The identified trends are determined as associated with a first dimension of the data corresponding to the selected first data field and at least one additional dimension corresponding to at least one additional data field.

For example, a high correlation between sales quantities (where sales quantity is the selected first data field) and a location can be identified in the data from the data source, and/or trends in requesting reports based on sales quantities and a salesperson can be determined. Based on such determination, the location and/or the salesperson can be suggested for generating a report (or multiple reports for the combinations). For example, based on identifying various combinations, more than one option for suggestion of data fields to form a query for a report can be defined.

In some instances, the predictive logic execution can include computing correlations between data associated with the first dimension and at least one more dimension of other dimensions of the data from the data source. In some instances, the correlation between the data for the various data fields can be pre-computed or can be generated live, depending on the availability of the data to the analytical tool. In some instances, if the correlations have to be calculated for vast amount of data that is not previously available to the analytical tool, the data that can be used for the predictive execution can be restricted, for example, focused on the latest data up to a threshold value to support assisted discovery of relevant data fields for the report in a timely yet reliable manner (e.g., focused on latest trends). In can be understood that the portion of the data that can be used to assist in the selection of relevant data fields can be determined during the process 300 execution or can be pre-configured.

At 330, a second data field from the set of at least one additional data field(s) is identified for report generation. For example, and in the context of the above example, the location can be identified as an additional data field, and the sales quantities and the location can be used to query the data to generate a report. Also, an identification of both location and a salesperson can be used to define the query for the report generation. As described, the second data field corresponds to a second dimension (location or salesperson as generic type dimensions) correlated with the first dimension to define trends in measurements (in the example, those are the sales quantities) from the data from the data source. For example, the report can be defined as a bar chart, graph, or other two- or three-dimensional graphic to represent the relationship between the data associated with the different data fields, e.g., sales quantities and a location.

At 340, in response to identifying the second data field, the user is provided with an updated selection and a report at the interface. The user is provided with i) a selection (as an updated selection to the initial selection of the first data field) of the first and the second data fields from the list of data fields and ii) a first report generated based on data associated with the selected first and second data fields.

In some instances, a second user selection can be received at the interface from the user. The second user selection can be an interaction to modify the selection of the first and second data fields from the list of data fields. The second user selection modifies the selection of the second data field to a selection of a sub-dimension of the second data field as a new second data field. For example, if the first selected data field is "Sales Quantity" and the second data field as proposed by the selector is "Products," the second user selection can modify the selection of "Products" to a particular product, e.g., "Shoes". The "Shoes" dimension is a sub-dimension of the dimension "Products" and can be visualized as a child node in a hierarchical structure presenting the dimensions from the list used for the selection.

In some instances, based on the modification, a third data field from the data fields can be identified (e.g., by the selector) based on executing the predictive logic to identify trends in the data between i) the first data field and the new second data field and ii) other data fields. In this way, the selector logic and the user can iteratively modify the definition of a report in a selector-guided manner to generate useful report results.

Figure 4:
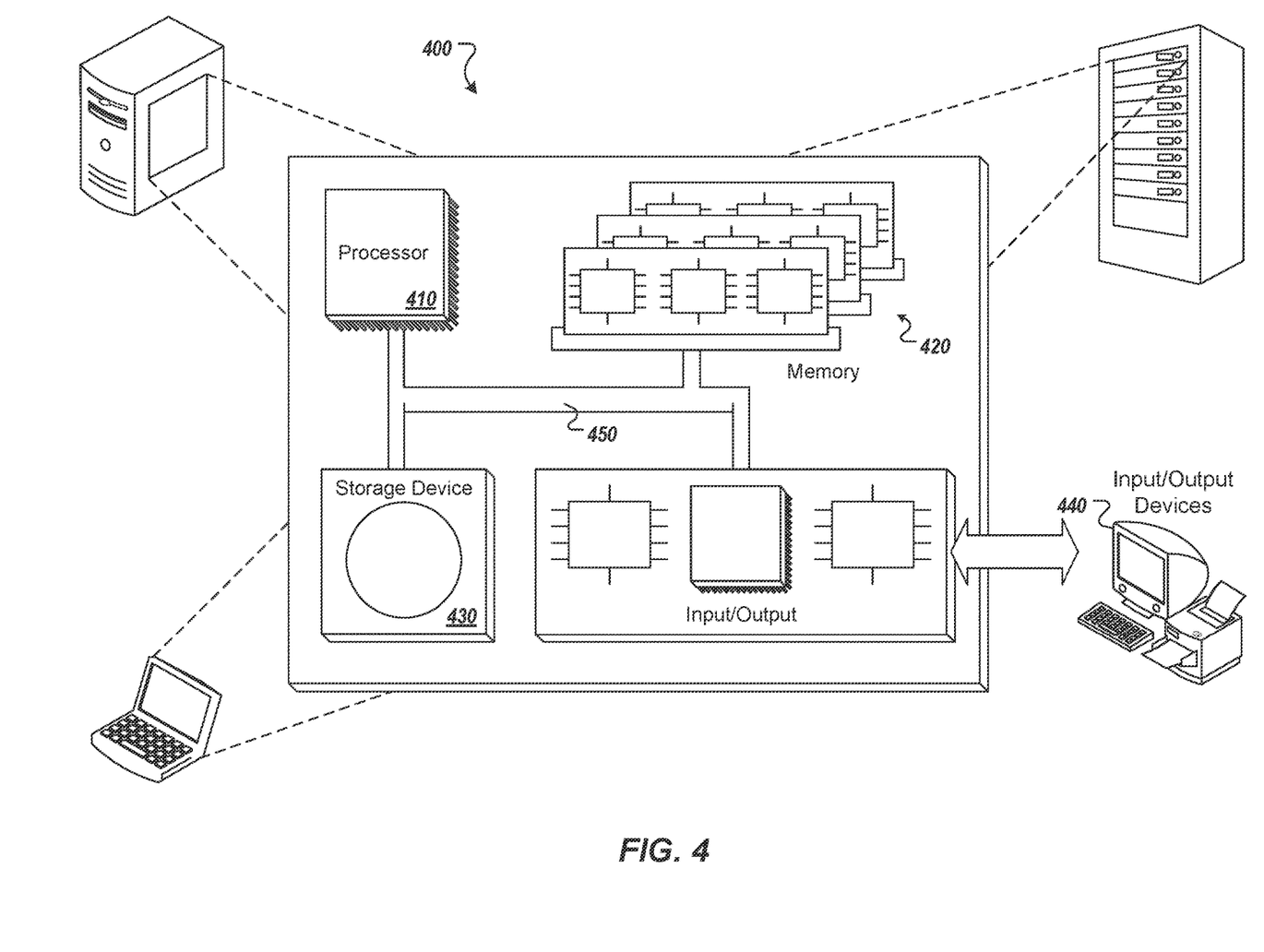
FIG. 4 is a schematic diagram of an example computer system that can be used to execute implementations of the present disclosure.

FIG. 4 is a schematic diagram of an example computer system 400 that can be used to execute implementations of the present disclosure. For example, the computer system 400 may be included in any or all of the server components discussed herein. The computer system 400 includes a processor 410, a memory 420, a storage device 430, and an input/output device 440. The components 410, 420, 430, and 440 are interconnected using a system bus 450. The processor 410 is capable of processing instructions for execution within the computer system 400. In some implementations, the processor 410 is a single-threaded processor. In some implementations, the processor 410 is a multi-threaded processor. The processor 410 is capable of processing instructions stored in the memory 420 or on the storage device 430 to display graphical information for a user interface on the input/output device 440.

The memory 420 stores information within the computer system 400. In some implementations, the memory 420 is a computer-readable medium. In some implementations, the memory 420 is a volatile memory unit. In some implementations, the memory 420 is a non-volatile memory unit. The storage device 430 is capable of providing mass storage for the system 400. In some implementations, the storage device 430 is a computer-readable medium. In some implementations, the storage device 430 may be a floppy disk device, a hard disk device, an optical disk device, or a tape device. The input/output device 440 provides input/output operations for the computer system 400. In some implementations, the input/output device 440 includes a keyboard and/or pointing device. In some implementations, the input/output device 440 includes a display unit for displaying graphical user interfaces.

The features described can be implemented in digital electronic circuitry, or in computer hardware, firmware, software, or combinations of these. The apparatus can be implemented in a computer program product tangibly embodied in an information carrier (for example, in a machine-readable storage device, for execution by a programmable processor), and method operations can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or another unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory, or both. Elements of a computer can include a processor for executing instructions and one or more memories for storing instructions and data. Generally, a computer can also include, or be operatively coupled to communicate with, one or more mass storage devices for storing data files. Such devices include magnetic disks, such as internal hard disks and removable disks, magneto-optical disks, and optical disks. Storage devices suitable for tangibly embodying computer program instructions and data include all forms of non-volatile memory, including by way of example semiconductor memory devices, such as sPROM, EEPROM, and flash memory devices, magnetic disks such as internal hard disks and removable disks, magneto-optical disks, and CD-ROM and DVD-ROM disks. The processor and the memory can be supplemented by, or incorporated in, ASICs (application-specific integrated circuits).

To provide for interaction with a user, the features can be implemented on a computer having a display device such as a cathode ray tube (CRT) or liquid crystal display (LCD) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of these. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the one described. The relationship between client and server arises by virtue of computer programs running on the respective computers and having a client-server relationship with each other.

In addition, the logic flows depicted in the figures do not require the particular order shown, or sequential order, to achieve desirable results. In addition, other operations may be provided, or operations may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

In view of the above-described implementations of subject matter, this application discloses the following list of examples, wherein one feature of an example in isolation or more than one feature of said example taken in combination and, optionally, in combination with one or more features of one or more further examples are further examples also falling within the disclosure of this application.

EXAMPLES

Although the present application is defined in the attached claims, it should be understood that the present invention can also be (alternatively) defined in accordance with the following examples:

Example 1. A computer-implemented method comprising:
receiving, at an interface associated with an analytical tool, a first selection by a user of a first data field from a list of data fields exposed for report generation;
in response to receiving the first selection, executing predictive logic to identify trends in data from a data source associated with i) a first dimension of the data corresponding to the selected first data field and ii) at least one additional dimension corresponding to at least one additional data field;
identifying a second data field from the at least one additional data field from the data fields for report generation, wherein the second data field corresponds to a second dimension correlated with the first dimension to define trends in one or more measurements from the data from the data source; and
in response to identifying the second data field, presenting, at the interface associated with the analytical tool, i) a selection of the first and the second data fields from the list of data fields and ii) a first report generated based on data associated with the selected first and second data fields.

Example 2. The method of Example 1, further comprising:
updating the interface for generating reports based on the data from the data source, wherein the interface provides the list of data fields comprising data fields corresponding to model entities of a data model for the data from the data source.

Example 3. The method of any one of the preceding Examples, wherein the data fields of the list are model entities of a data model representing dimensions of the data from the data source, wherein the dimensions refer to data objects representing categorical, transactional, and numerical data in the data from the data source, and wherein the list of data fields are presented in a hierarchical structure corresponding to relationships of respective dimensions at the data model.

Example 4. The method of any one of the preceding Examples, wherein the data fields of the list are model entities representing different types of dimensions including generic dimensions, aggregate measures, and time dimensions defined in the data from the data source.

Example 5. The method of any one of the preceding Examples, wherein executing the predictive logic comprises:
computing at least one correlation between data associated with the first dimension and at least one more dimension of other dimensions of the data from the data source.

Example 6. The method of any one of the preceding Examples, wherein executing the predictive logic comprises identifying historical data trends identified in a plurality of stored reports generated based on past report generation executed by a plurality of users based on the data source.

Example 7. The method of any one of the preceding Examples, further comprising:
storing the generated first report in a report repository based on receiving instructions from the user.

Example 8. The method of any one of the preceding Examples, further comprising:
receiving a second user selection at the interface to modify the selection of the first and second data fields from the list of data fields, wherein the second user selection modifies the selection of the second data field to a selection of a sub-dimension of the second data field as a new second data field; and
dynamically identifying a third field from the data fields based on executing the predictive logic to identify trends in the data between i) the first data field and the new second data field and ii) other data fields.

Example 9. The method of any one of the preceding Examples, further comprising:
receiving a request for connection to the data source through the interface; and
generating the data model associated with the data source for data to be used for generating a report.

Example 10. A system comprising:
one or more processors; and
one or more computer-readable memories coupled to the one or more processors and having instructions stored thereon that are executable by the one or more processors to perform the method of any of Examples 1 to 9.

Example 11: A non-transitory, computer-readable medium coupled to one or more processors and having instructions stored thereon which, when executed by the one or more processors, cause the one or more processors to perform the method of any of Examples 1 to 9.

What is claimed is:

1. A computer-implemented method comprising:
receiving, at an interface associated with an analytical tool, a first selection by a user of a first data field from a list of data fields exposed for report generation, the list of fields associated dimensions of data stored in a data source;
in response to receiving the first selection, executing predictive logic to identify trends in data from the data source;
identifying, based on the executed predictive logic, i) a first dimension of the data corresponding to the selected first data field and ii) at least one other dimension corresponding to at least one other data field from the list of data fields that was exposed for the report generation and was not selected;
identifying a second data field from the at least one other data field from the data fields for report generation, wherein the second data field corresponds to a second dimension correlated with the first dimension to define trends in one or more measurements from the data from the data source; and
in response to identifying the second data field, presenting, at the interface associated with the analytical tool, i) a selection of the first and the second data fields from the list of data fields and ii) a first report generated based on data associated with the selected first and second data fields.

2. The computer-implemented method of claim 1, further comprising:
updating the interface for generating reports based on the data from the data source, wherein the interface provides the list of data fields comprising data fields corresponding to model entities of a data model for the data from the data source.

3. The computer-implemented method of claim 1, wherein the data fields of the list are model entities of a data model representing dimensions of the data from the data source, wherein the dimensions refer to data objects representing categorical, transactional, and numerical data in the data from the data source, and wherein the list of data fields are presented in a hierarchical structure corresponding to relationships of respective dimensions at the data model.

4. The computer-implemented method of claim 1, wherein the data fields of the list are model entities representing different types of dimensions including generic dimensions, aggregate measures, and time dimensions defined in the data from the data source.

5. The computer-implemented method of claim 1, wherein executing the predictive logic comprises:
computing at least one correlation between data associated with the first dimension and at least one more dimension of other dimensions of the data from the data source.

6. The computer-implemented method of claim 1, wherein executing the predictive logic comprises identifying historical data trends identified in a plurality of stored reports generated based on past report generation executed by a plurality of users based on the data source.

7. The computer-implemented method of claim 1, further comprising:
storing the generated first report in a report repository based on receiving instructions from the user.

8. The computer-implemented method of claim 1, further comprising:
receiving a second user selection at the interface to modify the selection of the first and second data fields from the list of data fields, wherein the second user selection modifies the selection of the second data field to a selection of a sub-dimension of the second data field as a new second data field; and dynamically identifying a third field from the data fields based on executing the predictive logic to identify trends in the data between i) the first data field and the new second data field and ii) other data fields.

9. The computer-implemented method of claim 1, further comprising:

receiving a request for connection to the data source through the interface; and generating the data model associated with the data source for data to be used for generating a report.

10. A system comprising:

one or more processors; and one or more computer-readable memories coupled to the one or more processors and having instructions stored thereon that are executable by the one or more processors to perform operations comprising:

receiving, at an interface associated with an analytical tool, a first selection by a user of a first data field from a list of data fields exposed for report generation, the list of fields associated dimensions of data stored in a data source;

in response to receiving the first selection, executing predictive logic to identify trends in data from the data source;

identifying, based on the executed predictive logic, i) a first dimension of the data corresponding to the selected first data field and ii) at least one other dimension corresponding to at least one other data field from the list of data fields that was exposed for the report generation and was not selected;

identifying a second data field from the at least one other data field from the data fields for report generation, wherein the second data field corresponds to a second dimension correlated with the first dimension to define trends in one or more measurements from the data from the data source; and in response to identifying the second data field, presenting, at the interface associated with the analytical tool, i) a selection of the first and the second data fields from the list of data fields and ii) a first report generated based on data associated with the selected first and second data fields.

11. The system of claim 10, wherein the one or more computer-readable memories store instructions, which when executed cause the one or more processors to perform operations comprising:

updating the interface for generating reports based on the data from the data source, wherein the interface provides the list of data fields comprising data fields corresponding to model entities of a data model for the data from the data source.

12. The system of claim 10, wherein the data fields of the list are model entities of a data model representing dimensions of the data from the data source, wherein the dimensions refer to data objects representing categorical, transactional, and numerical data in the data from the data source, and wherein the list of data fields are presented in a hierarchical structure corresponding to relationships of respective dimensions at the data model.

13. The system of claim 10, wherein the data fields of the list are model entities representing different types of dimensions including generic dimensions, aggregate measures, and time dimensions defined in the data from the data source.

14. The system of claim 10, wherein executing the predictive logic comprises:

computing at least one correlation between data associated with the first dimension and at least one more dimension of other dimensions of the data from the data source.

15. The system of claim 10, wherein executing the predictive logic comprises identifying historical data trends identified in a plurality of stored reports generated based on past report generation executed by a plurality of users based on the data source.

16. The system of claim 10, wherein the one or more computer-readable memories store instructions, which when executed cause the one or more processors to perform operations comprising:

storing the generated first report in a report repository based on receiving instructions from the user.

17. A non-transitory, computer-readable medium coupled to one or more processors and having instructions stored thereon which, when executed by the one or more processors, cause the one or more processors to perform operations comprising:

receiving, at an interface associated with an analytical tool, a first selection by a user of a first data field from a list of data fields exposed for report generation, the list of fields associated dimensions of data stored in a data source;

in response to receiving the first selection, executing predictive logic to identify trends in data from the data source;

identifying, based on the executed predictive logic, i) a first dimension of the data corresponding to the selected first data field and ii) at least one other dimension corresponding to at least one other data field from the list of data fields that was exposed for the report generation and was not selected;

identifying a second data field from the at least one other data field from the data fields for report generation, wherein the second data field corresponds to a second dimension correlated with the first dimension to define trends in one or more measurements from the data from the data source; and in response to identifying the second data field, presenting, at the interface associated with the analytical tool, i) a selection of the first and the second data fields from the list of data fields and ii) a first report generated based on data associated with the selected first and second data fields.

18. The non-transitory, computer-readable medium of claim 17, further store instructions, which when executed cause the one or more processors to perform operations comprising:

updating the interface for generating reports based on the data from the data source, wherein the interface provides the list of data fields comprising data fields corresponding to model entities of a data model for the data from the data source.

19. The non-transitory, computer-readable medium of claim 17, wherein the data fields of the list are model entities of a data model representing dimensions of the data from the data source, wherein the dimensions refer to data objects representing categorical, transactional, and numerical data in the data from the data source, and wherein the list of data fields are presented in a hierarchical structure corresponding to relationships of respective dimensions at the data model.

20. The non-transitory, computer-readable medium of claim 17, wherein the data fields of the list are model entities representing different types of dimensions including generic dimensions, aggregate measures, and time dimensions defined in the data from the data source.

\* \* \* \* \*